US008655067B2

(12) United States Patent
Hayashi

(10) Patent No.: US 8,655,067 B2
(45) Date of Patent: Feb. 18, 2014

(54) IMAGE PROCESSING APPARATUS, IMAGE PROCESSING METHOD, AND COMPUTER PROGRAM PRODUCT

(75) Inventor: Koji Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 446 days.

(21) Appl. No.: 13/067,229

(22) Filed: May 18, 2011

(65) Prior Publication Data

US 2011/0286667 A1    Nov. 24, 2011

(30) Foreign Application Priority Data

May 24, 2010    (JP) ................................ 2010-118121
Apr. 20, 2011    (JP) ................................ 2011-094482

(51) Int. Cl.
*G06K 9/00* (2006.01)
(52) U.S. Cl.
USPC ......................................................... 382/167
(58) Field of Classification Search
USPC .................. 382/162, 165, 167, 274; 358/520
See application file for complete search history.

(56) References Cited

U.S. PATENT DOCUMENTS

| | | | |
|---|---|---|---|
| 5,982,947 A | 11/1999 | Hayashi | |
| 6,055,071 A | 4/2000 | Kuwata et al. | |
| 6,160,922 A | 12/2000 | Hayashi | |
| 6,185,007 B1 | 2/2001 | Hayashi et al. | |
| 6,271,934 B1 | 8/2001 | Hayashi | |
| 6,819,439 B2 | 11/2004 | Hayashi et al. | |
| 7,545,536 B2 | 6/2009 | Hayashi | |
| 8,325,396 B2 | 12/2012 | Kishimoto | |
| 2005/0036173 A1 | 2/2005 | Hayashi et al. | |
| 2007/0133869 A1* | 6/2007 | Bhattacharjya | 382/167 |
| 2007/0273929 A1 | 11/2007 | Hayashi | |
| 2008/0030816 A1* | 2/2008 | Jang | 358/530 |
| 2008/0137148 A1 | 6/2008 | Oh et al. | |
| 2009/0141295 A1 | 6/2009 | Hayashi | |
| 2009/0231645 A1 | 9/2009 | Hayashi | |
| 2010/0208985 A1* | 8/2010 | Lee et al. | 382/163 |

FOREIGN PATENT DOCUMENTS

| | | |
|---|---|---|
| CN | 101582977 | 11/2009 |
| EP | 1 292 112 | 3/2003 |
| EP | 1 924 076 | 5/2008 |

(Continued)

OTHER PUBLICATIONS

Abstract of JP 2002-051222 published Feb. 15, 2002.

(Continued)

*Primary Examiner* — Phuoc Tran
(74) *Attorney, Agent, or Firm* — Harness, Dickey & Pierce, P.L.C.

(57) ABSTRACT

An image processing apparatus includes a hue identifying unit that identifies to which hue region among three or more hue regions provided in a color space a hue of each pixel contained in input image data belongs; an output-color converting unit that converts a color of each pixel to a predetermined output color in accordance with the identified hue region; a luminance calculating unit that selects a luminance calculation coefficient corresponding to the identified hue region of each pixel from among luminance calculation coefficients determined for the respective hue regions, and calculates luminance to be applied to each pixel of image data converted to the output color, on the basis of the selected luminance calculation coefficient; and an image-data generating unit that applies the calculated luminance to each pixel in the converted image data to generate color-reduced image data containing a reduced number of colors than the input image data.

17 Claims, 13 Drawing Sheets

(56) References Cited

FOREIGN PATENT DOCUMENTS

| JP | 2001352454 A | 12/2001 |
|----|--------------|---------|
| JP | 4304846 A | 2/2002 |
| JP | 2007215216 A | 8/2007 |
| JP | 2008154131 A | 7/2008 |
| JP | 200989382 | 4/2009 |
| JP | 2009232342 A | 10/2009 |

OTHER PUBLICATIONS

Abstract of JP 2007-215216 published Aug. 23, 2007.
Abstract of JP 2009-089382 published Apr. 23, 2009.
Abstract of JP 2009-232342 published Oct. 8, 2009.
Abstract of JP 2001-352454 published Dec. 21, 2001.
Abstract of JP 2008-154131 published Jul. 3, 2008.
First Office Action for corresponding Chinese patent application No. 201110235356.2 dated Jun. 4, 2013 with English translation.
Extended search report for European patent application No. 11165843.1 dated Aug. 22, 2011.
Bala et al., "Color-to-grayscale conversion to maintain discriminability," Color Imaging IX: Processing, Hardcopy, and Applications, Proceedings of SPIE—IS&T Electronic Imaging, SPIE, US, vol. 5293, Jan. 20, 2004, pp. 196-202, XP007908249, DOI: 10.1117/12.532192; ISNB: 978-0/8194-5196-5, retrieved on Feb. 11, 2004.

* cited by examiner

| ID | HUE REGION A | | | HUE REGION B | | | HUE REGION C | | | ... | HUE REGION F | | |
|---|---|---|---|---|---|---|---|---|---|---|---|---|---|
| | αa | βa | γa | αb | βb | γb | αc | βc | γc | ... | αf | βf | γf |
| 01 | 0.3 | 0.5 | 0.2 | 0.36 | 0.3 | 0.24 | 0.3 | 0.4 | 0.2 | ... | 0.3 | 0.4 | 0.3 |
| 02 | 0.03 | 0.05 | 0.02 | 0.3 | 0.5 | 0.2 | 0.3 | 0.4 | 0.2 | ... | 0.3 | 0.4 | 0.3 |
| 03 | 0.3 | 0.2 | 0.2 | 0.25 | 0.65 | 0.18 | 0.36 | 0.3 | 0.24 | ... | 0 | 0.1 | 0 |

FIG.10

| ID | ORIGINAL CODE | HUE REGION A | | | HUE REGION B | | | HUE REGION C | | | ... | HUE REGION F | | |
|----|---------------|------|------|------|------|------|------|------|------|------|-----|------|------|------|
|    |               | αa   | βa   | γa   | αb   | βb   | γb   | αc   | βc   | γc   |     | αf   | βf   | γf   |
| 01 | 1  | 0.45 | 0.5  | 0.2  | 0.36 | 0.3  | 0.24 | 0.3  | 0.4  | 0.2  |     | 0.3  | 0.4  | 0.3  |
| 02 | 1  | 0.05 | 0.05 | 0.02 | 0.3  | 0.5  | 0.2  | 0.3  | 0.4  | 0.2  | ... | 0.3  | 0.4  | 0.3  |
| 03 | 1  | 0.45 | 0.2  | 0.2  | 0.25 | 0.65 | 0.18 | 0.36 | 0.3  | 0.24 |     | 0.03 | 0.05 | 0.02 |
| 04 | 2  | 0.04 | 0.05 | 0.02 | 0.3  | 0.5  | 0.2  | 0.3  | 0.4  | 0.2  |     | 0.3  | 0.4  | 0.3  |
| 05 | 2  | 0.4  | 0.2  | 0.2  | 0.25 | 0.65 | 0.18 | 0.36 | 0.3  | 0.24 |     | 0.03 | 0.05 | 0.02 |
| 06 | 2  | 0.04 | 0.05 | 0.02 | 0.3  | 0.5  | 0.2  | 0.3  | 0.4  | 0.2  |     | 0.3  | 0.4  | 0.3  |
| 07 | 99 | 0.3  | 0.2  | 0.2  | 0.25 | 0.65 | 0.18 | 0.36 | 0.3  | 0.24 |     | 0.03 | 0.05 | 0.02 |
| 08 | 99 | 0.03 | 0.05 | 0.02 | 0.3  | 0.5  | 0.2  | 0.3  | 0.4  | 0.2  |     | 0.3  | 0.4  | 0.3  |
| 09 | 99 | 0.3  | 0.2  | 0.2  | 0.25 | 0.65 | 0.18 | 0.36 | 0.3  | 0.24 |     | 0.03 | 0.05 | 0.02 |

ORIGINAL CODE "1": ORIGINAL WITH STAMP IN RED INK
"2": ORIGINAL CONTAINING PORTION WRITTEN WITH FLUORESCENT PEN
"99": ALL ORIGINALS (GENERAL-PURPOSE ORIGINAL)

FIG.12

| ID | USAGE CODE | HUE REGION A | | | HUE REGION B | | | HUE REGION C | | | ... | HUE REGION F | | |
|---|---|---|---|---|---|---|---|---|---|---|---|---|---|---|
| | | $\alpha a$ | $\beta a$ | $\gamma a$ | $\alpha b$ | $\beta b$ | $\gamma b$ | $\alpha c$ | $\beta c$ | $\gamma c$ | ... | $\alpha f$ | $\beta f$ | $\gamma f$ |
| 01 | 1 | 0.55 | 0.5 | 0.2 | 0.36 | 0.3 | 0.24 | 0.3 | 0.4 | 0.2 | | 0.3 | 0.4 | 0.3 |
| 02 | 1 | 0.07 | 0.05 | 0.02 | 0.3 | 0.5 | 0.2 | 0.3 | 0.4 | 0.2 | ... | 0.3 | 0.4 | 0.3 |
| 03 | 1 | 0.47 | 0.2 | 0.2 | 0.25 | 0.65 | 0.18 | 0.36 | 0.3 | 0.24 | | 0.03 | 0.05 | 0.02 |
| 04 | 2 | 0.05 | 0.05 | 0.02 | 0.3 | 0.5 | 0.2 | 0.3 | 0.4 | 0.2 | | 0.3 | 0.4 | 0.3 |
| 05 | 2 | 0.52 | 0.2 | 0.2 | 0.25 | 0.65 | 0.18 | 0.36 | 0.3 | 0.24 | | 0.03 | 0.05 | 0.02 |
| 06 | 2 | 0.53 | 0.05 | 0.02 | 0.3 | 0.5 | 0.2 | 0.3 | 0.4 | 0.2 | | 0.3 | 0.4 | 0.3 |
| 07 | 99 | 0.6 | 0.2 | 0.2 | 0.25 | 0.65 | 0.18 | 0.36 | 0.3 | 0.24 | | 0.03 | 0.05 | 0.02 |
| 08 | 99 | 0.57 | 0.05 | 0.02 | 0.3 | 0.5 | 0.2 | 0.3 | 0.4 | 0.2 | | 0.3 | 0.4 | 0.3 |
| 09 | 99 | 0.4 | 0.2 | 0.2 | 0.25 | 0.65 | 0.18 | 0.36 | 0.3 | 0.24 | | 0.03 | 0.05 | 0.02 |

ORIGINAL CODE "1": FOR USE AS POP ADVERTISING
"2": FOR USE AS MAP OF URBAN AREA
"99": FOR ANY PURPOSES (GENERAL USE)

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-118121 filed in Japan on May 24, 2010 and Japanese Patent Application No. 2011-094482 filed in Japan on Apr. 20, 2011.

BACKGROUND OF THE INVENTION

1. Field of the Invention

The present invention relates to an image processing apparatus, an image processing method, and a computer program product.

2. Description of the Related Art

In general, image processing apparatuses, such as copiers, handle an original as a collection of pixels, each having a tiny area, and represent the color of each pixel by values (tone values), each indicating the intensity (luminance) of any of color components R (red), G(green), and B (blue) that are the three primary colors of light, in order to output an image, in which the color shade of the original is accurately reproduced, through printing or the like. In recent years, image processing apparatuses have been required to realize not only the function of accurately reproducing the color shade of a color original but also various other functions, such as a function of converting a color original into a black-and-white (monochrome) image for output or a function of converting a color original into a two-color image formed of achromatic color and chromatic color for output, by processing the tone values of the above color components in accordance with user's needs.

As for the method of converting a color image into a monochrome image, a conventional method has been known, in which a tone value of each of the RGB color components of each of pixels contained in a color image is multiplied by a predetermined weighting factor, and the sum of the multiplied tone values is used as a tone value that represents the luminance of the pixel in order to generate a monochrome image. However, in the conventional method, when colors in an original have almost the same luminance, even if the colors differ in hue, the colors are represented at the same concentration in a monochrome image. Therefore, there is a problem in that a difference between colors in an original cannot be appropriately represented in a monochrome image.

As a method for addressing the above problem, there is a known method, in which, when a large number of colors are used in an image of an original and if a variation range of the luminance in a monochrome image obtained by conversion is narrow, the luminance of a pixel having a color that is most frequently used in the image of the original is increased in the monochrome image in order to enhance this color (see, for example, Japanese Patent No. 4304846). Furthermore, there is another known method, in which the appearance frequency (the number of pixels) is obtained for each hue of colors contained in an image of an original, a color contained in the hue with the highest appearance frequency is determined as a feature color, and the luminance of each pixel having the feature color is enhanced in a monochrome image (see, for example, Japanese Patent Application Laid-open No. 2007-215216).

Moreover, there is still another known method, in which the color of each pixel contained in an image of an original is plotted on the a*b* plane of the L*a*b* color space, a predetermined angle is added to a hue angle of each plot to convert the hue, differences in the tone values of respective RGB components between before and after the hue conversion are averaged, and the average is added to a luminance value that has been calculated before the hue conversion, so as to generate a monochrome image with a color image taken into consideration (see, for example, Japanese Patent Application Laid-open No. 2009-89382).

However, in the conventional methods disclosed in Japanese Patent No. 4304846 and Japanese Patent Application Laid-open No. 2007-215216, because only a color with the highest appearance frequency in an input image is enhanced in an output image, various hues contained in the input image cannot be distinguished by shade differences in a monochrome image. Furthermore, in the conventional method disclosed in Japanese Patent Application Laid-open No. 2009-89382, whether the average of the differences in the tone values of the respective RGB components between before and after the hue conversion is an appropriate value or not depends on the color distribution of an input image. Therefore, in some cases, it may be difficult to obtain an appropriate shade difference, depending on the color distribution of an input image.

SUMMARY OF THE INVENTION

It is an object of the present invention to at least partially solve the problems in the conventional technology.

According to an aspect of the present invention, there is provided an image processing apparatus that includes a hue identifying unit that identifies to which hue region among three or more hue regions provided in a color space a hue of each pixel contained in input image data belongs; an output-color converting unit that converts a color of each pixel contained in the image data to a predetermined output color in accordance with the identified hue region; a luminance calculating unit that selects a luminance calculation coefficient corresponding to the identified hue region of each pixel from among luminance calculation coefficients that are determined in advance for the respective hue regions, and calculates luminance to be applied to each pixel of image data that has been converted to the output color, on the basis of the selected luminance calculation coefficient; and an image-data generating unit that applies the calculated luminance to each pixel contained in the converted image data to thereby generate color-reduced image data that contains a reduced number of colors than the input image data.

According to another aspect of the present invention, there is provided an image processing method that includes identifying to which hue region from among three or more hue regions provided in a color space hue of each pixel contained in input image data belongs; converting a color of each pixel contained in the image data to a predetermined output color in accordance with the identified hue region; selecting a luminance calculation coefficient corresponding to the identified hue region of each pixel from among luminance calculation coefficients that are determined in advance for the respective hue regions; calculating luminance to be applied to each pixel of image data that has been converted to the output color, on the basis of the selected luminance calculation coefficient; and applying the calculated luminance to each pixel contained in the converted image data, thereby generating color-reduced image data that contains a reduced number of colors than the input image data.

According to still another aspect of the present invention, there is provided a computer program product including a non-transitory computer-readable medium having computer-readable program codes recorded in the medium. The program codes when executed causes a computer to execute identifying to which hue region from among three or more hue regions provided in a color space hue of each pixel contained in input image data belongs; converting a color of each pixel contained in the image data to a predetermined output color in accordance with the identified hue region; selecting a luminance calculation coefficient corresponding to the identified hue region of each pixel from among luminance calculation coefficients that are determined in advance for the respective hue regions; calculating luminance to be applied to each pixel of image data that has been converted to the output color, on the basis of the selected luminance calculation coefficient; and applying the calculated luminance to each pixel contained in the converted image data, thereby generating color-reduced image data that contains a reduced number of colors than the input image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is an explanatory diagram illustrating an example of a luminance calculation coefficient table according to a fourth modification;

FIG. 12 is an explanatory diagram illustrating an example of a luminance calculation coefficient table according to a fifth modification;

DETAILED DESCRIPTION OF THE PREFERRED EMBODIMENTS

Exemplary embodiments of an image processing apparatus, an image processing method, and a computer program product according to the present invention will be explained in detail below with reference to the accompanying drawings.

Figure 1:
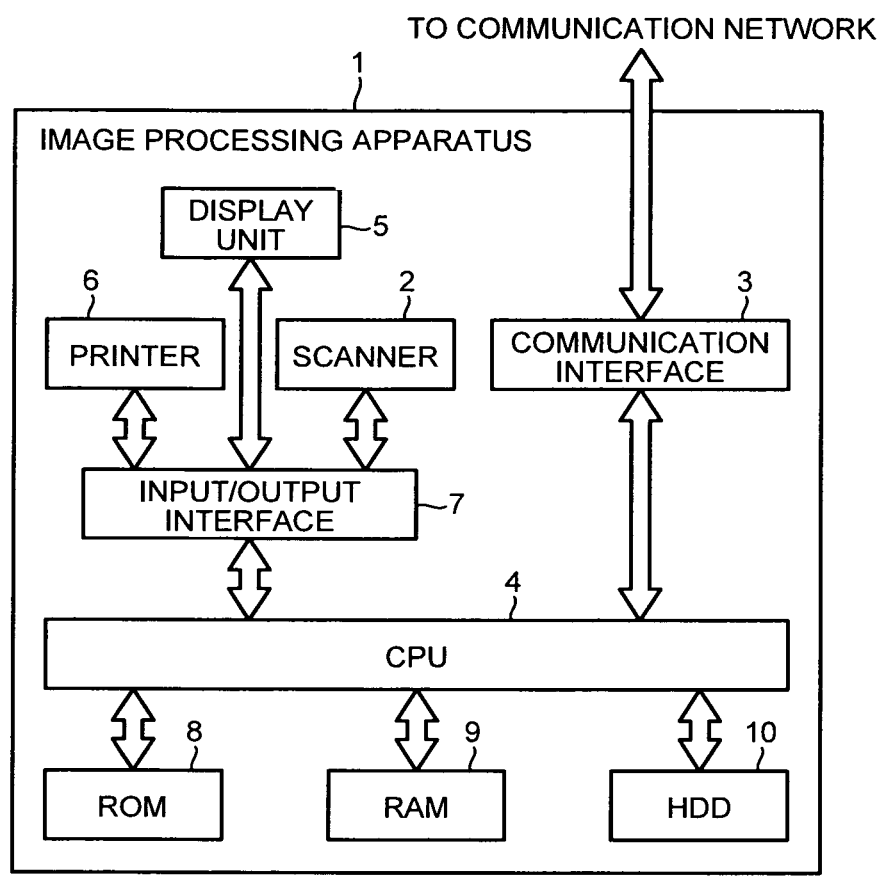
FIG. 1 is a block diagram of a hardware configuration of an image processing apparatus according to an embodiment.

FIG. 1 is a block diagram of a hardware configuration of an image processing apparatus according to an embodiment. The image processing apparatus according to the embodiment is a copier or a multifunction peripheral having a copy function. However, the present invention is not limited to this example, and may be applied to the configuration of a normal computer.

As illustrated in FIG. 1, an image processing apparatus 1 of the embodiment mainly includes, as the hardware configuration, a scanner 2, a printer 6, a display unit 5, a communication interface 3, an input/output interface 7, a CPU (Central Processing Unit) 4, a ROM (Read Only Memory) 8, a RAM (Random Access Memory) 9, and a HDD (Hard Disk Drive) 10.

The scanner 2 is an engine that reads an original and outputs an image of the read original as input image data.

The communication interface 3 is an interface for receiving image data from external personal computers (PC) (not illustrated) or the like via a communication network or the like.

The CPU 4 controls the entire image processing apparatus 1. According to the embodiment, the CPU 4 generates color-reduced image data, which contains fewer colors than the number of colors contained in input image data, from the input image data. Details of image processing that the CPU 4 performs by executing an image processing program will be described later.

The display unit 5 is a display device for displaying various screens for a user. According to the embodiment, the display unit 5 displays color-reduced image data that contains fewer colors than the number of colors contained in the input image data. The display unit 5 of the embodiment has a touch panel system and functions as an input device that allows a user to input various types of information, such as setting information, by touch operation.

The input/output interface 7 is an interface for performing data communication when the display unit 5 performs various types of display operation, the printer 6 prints images, or the display unit 5 and the scanner 2 input various types of information.

The printer 6 is an engine that prints the generated color-reduced image data. The ROM 8 is a nonvolatile memory for storing the image processing program to be executed by the CPU 4. The RAM 9 is a volatile memory for loading the image processing program to be executed by the CPU 4 or temporarily storing data.

The HDD 10 is a storage medium for storing various types of data. According to the embodiment, the HDD 10 functions as a luminance-calculation-coefficient storage unit and stores therein luminance calculation coefficient groups in advance, which will be described later.

Figure 2:
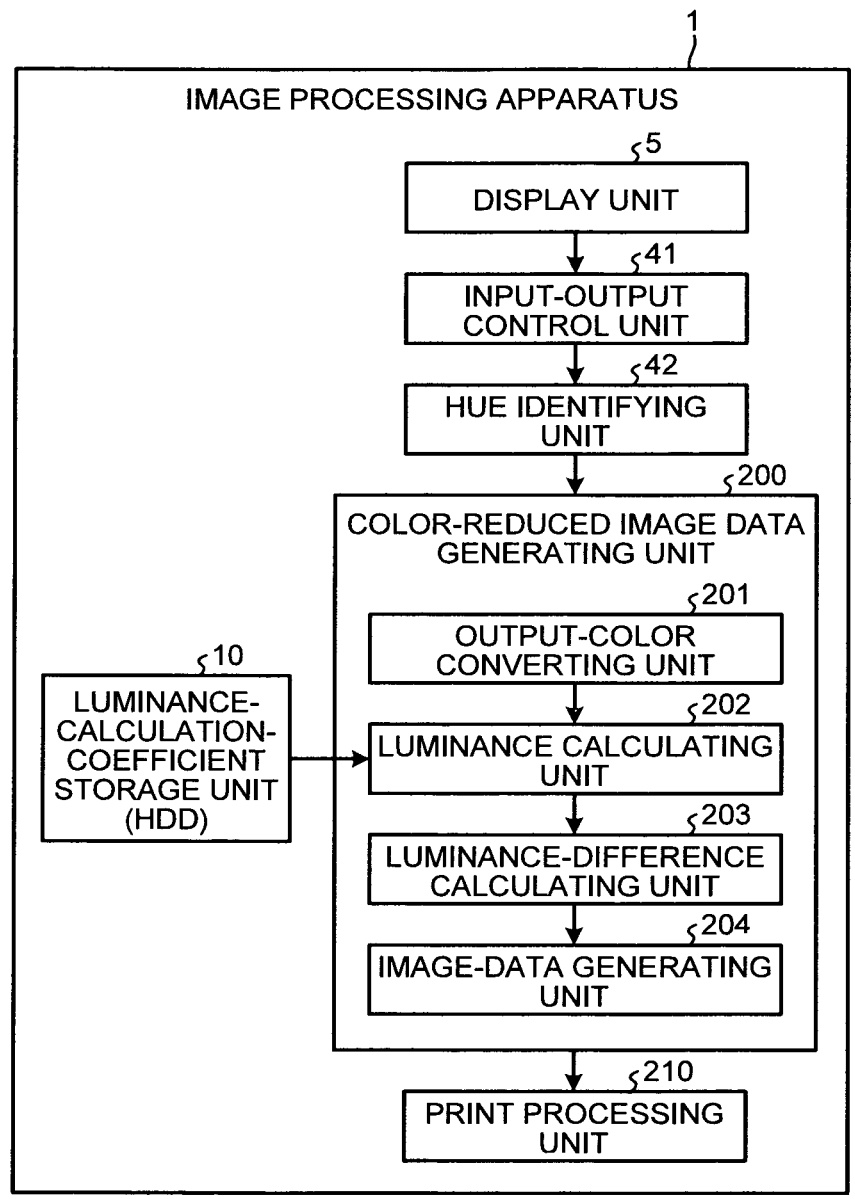
FIG. 2 is a block diagram of a functional configuration of the image processing apparatus according to the embodiment.

Details of the image processing performed by the CPU 4 will be described below. FIG. 2 is a block diagram of a functional configuration of the image processing apparatus 1 according to the embodiment. As illustrated in FIG. 2, the image processing apparatus 1 of the embodiment mainly includes the display unit 5, an input-output control unit 41, a hue identifying unit 42, a color-reduced image data generating unit 200, a print processing unit 210, and the luminance-calculation-coefficient storage unit (HDD) 10. The display unit 5 is explained above, and therefore, the same explanation will not be repeated.

The input-output control unit 41 controls input of, for example, input data that is input via the display unit 5 and the input/output interface or image data that is input from an external PC via the scanner 2 or the communication interface 3. The input-output control unit 41 also controls display of various screens on the display unit 5 via the input/output interface 7.

Figures 3, 4:
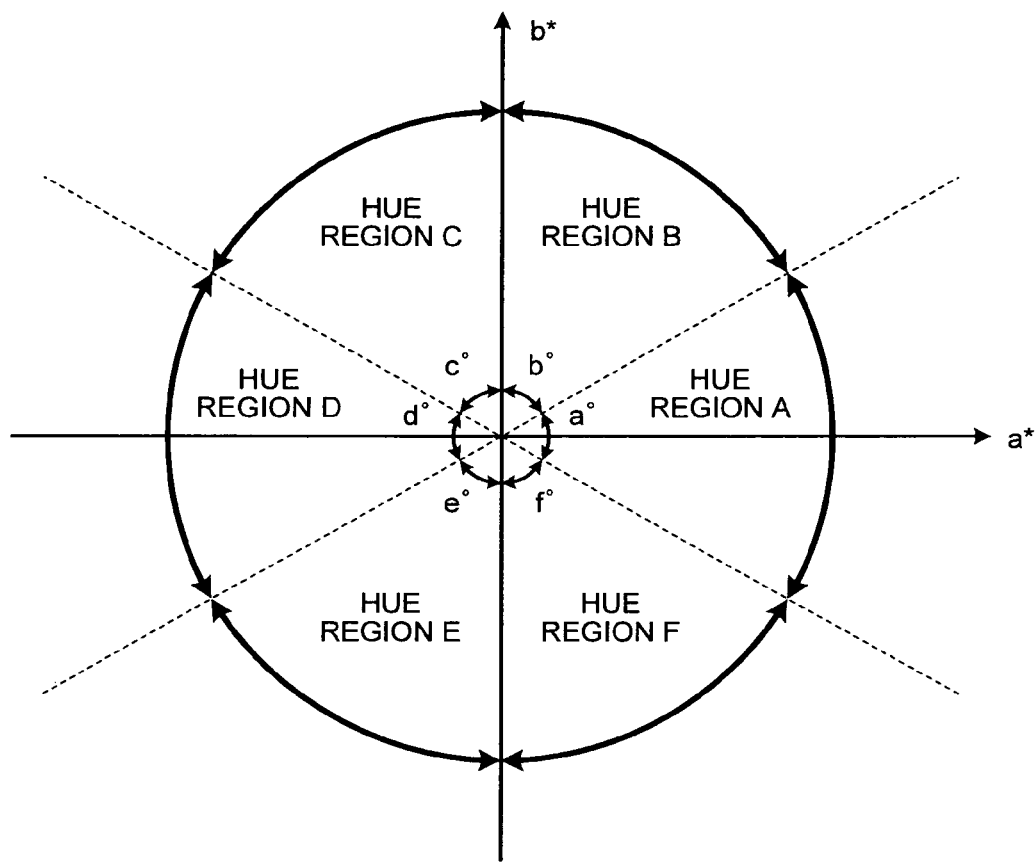
FIG. 3 is a diagram illustrating an example of setting of hue regions in a hue space.
FIG. 4 is an explanatory diagram illustrating an example of a luminance calculation coefficient table according to the embodiment.

The hue identifying unit 42 identifies to which hue region among three or more hue regions provided in a color space the hue of each pixel contained in the input image data belongs. FIG. 3 is a diagram illustrating an example of setting of the hue regions in a hue space. The hue regions are regions provided by dividing the color space by predetermined areas.

In the example of FIG. 3, assuming that the L*a*b* color space based on the L*a*b* color system is used as a color space, the hue angle is divided into predetermined angles a to f on the a*b* plane in the L*a*b* color space, so that six hue regions A to F are provided. The angles a to f, by which the hue angle is divided, may be uniformly set to 60° or may be non-uniformly set to 40°, 60°, 70°, 60°, 60°, and 60°, respectively.

Hereinafter, in the embodiment, the L*a*b* color space is used as a color space and the six hue regions A to F illustrated in FIG. 3 are explained as an example. However, the color space is not limited to the L*a*b* color space, and the hue regions are not limited to the example illustrated in FIG. 3.

The hue identifying unit 42 identifies to which hue region among the six hue regions the color of each pixel contained in the input image data (hereinafter, described as an "input pixel") belongs, on the basis of the color of the input pixel. More specifically, the hue identifying unit 42 plots the color of each input pixel on the a*b* plane and identifies in which hue region the color of the input pixel is contained.

The color-reduced image data generating unit 200 generates color-reduced image data that contains the reduced number of colors than the input image data. The print processing unit 210 controls the printer 6 to print the color-reduced image data generated by the color-reduced image data generating unit 200.

Referring back to FIG. 2, the color-reduced image data generating unit 200 will be described in detail below. The color-reduced image data generating unit 200 converts the color of a pixel in each of the hue regions to a predetermined output color for each input pixel, and calculates the luminance to be applied to the pixel after the color conversion in accordance with a basic color structure that the pixel has before the color conversion, thereby generating color-reduced image data. For example, the color-reduced image data generating unit 200 converts the color of each pixel in the hue regions A to C to a red output color and converts the color of each pixel in the hue regions E and F to a blue output color with respect to each input pixel, and calculates the luminance to be applied to each pixel after the color conversion in accordance with a basic color structure that each pixel has before the color conversion, thereby generating color-reduced image data.

As illustrated in FIG. 2, the color-reduced image data generating unit 200 includes an output-color converting unit 201, a luminance calculating unit 202, a luminance-difference calculating unit 203, and an image-data generating unit 204.

The output-color converting unit 201 converts the color of each pixel contained in the input image data to a predetermined output color, which is determined in advance, in accordance with the hue region identified by the hue identifying unit 42.

The luminance calculating unit 202 selects a luminance calculation coefficient group corresponding to the identified hue region for each pixel contained in the input image data, from a plurality of luminance calculation coefficient groups stored in the luminance-calculation-coefficient storage unit 10. Then, the luminance calculating unit 202 calculates luminance to be applied to each pixel of the image data that has been converted to the output color, on the basis of a plurality of luminance calculation coefficients in the selected luminance calculation coefficient group.

FIG. 4 is an explanatory diagram illustrating an example of a luminance calculation coefficient table stored in the luminance-calculation-coefficient storage unit 10. The luminance calculation coefficient table is data in which a luminance calculation coefficient group, which is a set of a plurality of luminance calculation coefficients that are determined in advance for respective colors that form image data, is registered as a unit for each hue region. A set of the luminance calculation coefficient groups contains the same number of sets of luminance calculation coefficients as the number of the hue regions provided in the color space. In the example illustrated in FIG. 4, six luminance calculation coefficient groups, which are respectively applied to the six hue regions A to F, are registered in the luminance calculation coefficient table so that the luminance can be separately calculated for each of the six hue regions A to F that are illustrated in FIG. 3 as an example of the hue regions of the embodiment.

According to the embodiment, in the luminance calculation coefficient table, a plurality of luminance calculation coefficient groups are registered for each hue region, and an ID as identification information is registered for each set of the six luminance calculation coefficient groups.

The luminance that each input pixel has after color conversion is calculated by the following Equation (1), in which tone values r, g, and b of basic color components R (red), G (green), and B (blue) are respectively multiplied by luminance calculation coefficients α, β, and γ, which are determined as a set in advance.

$$\text{Luminance} = \alpha \times r + \beta \times g + \gamma \times b \qquad (1)$$

Therefore, in the example of FIG. 4, luminance calculation coefficients applied to the hue region A are denoted by αa, βa, and γa, luminance calculation coefficients applied to the hue region B are denoted by αb, βb, and γb, luminance calculation coefficients applied to the hue region C are denoted by αc, βc, and γc, . . . , for example. Values that are determined in advance by analyzing various images of originals are registered as the luminance calculation coefficients in the luminance calculation coefficient table.

The luminance calculating unit 202 sequentially reads the luminance calculation coefficient groups from the luminance-calculation-coefficient storage unit 10, selects one luminance calculation coefficient group corresponding to a hue region to which an input pixel belongs among the six hue regions A to F illustrated in FIG. 3, and calculates luminance to be applied to the image data that has been converted to the output color, in accordance with Equation (1) with three luminance calculation coefficients contained in the selected one luminance calculation coefficient group.

The luminance-difference calculating unit 203 calculates the maximum luminance value of pixels belonging to each of the hue regions A to F on the basis of calculation performed by the luminance calculating unit 202, and then calculates a difference in the maximum luminance value between the hue regions (hereinafter, the difference is described as the "maximum luminance value difference").

The luminance calculating unit 202 calculates the luminance to be applied to each pixel of the image data that has been converted to the output color, in accordance with Equation (1) with the three luminance calculation coefficients contained in a luminance calculation coefficient group, with which the maximum luminance value difference calculated by the luminance-difference calculating unit 203 becomes equal to or greater than a predetermined lower limit of the luminance difference that is determined in advance.

More specifically, the luminance calculating unit 202 determines whether the maximum luminance value difference calculated by the luminance-difference calculating unit 203 is equal to the predetermined lower limit of the luminance difference. When the maximum luminance value difference is smaller than the predetermined lower limit of the luminance difference, the luminance calculating unit 202 selects a luminance calculation coefficient group with a different ID in accordance with the hue region identified by the hue identifying unit 42 from the luminance calculation coefficient table, and calculates luminance to be applied to each pixel of the image data that has been converted to the output color, in accordance with Equation (1) with three luminance calculation coefficients contained in the selected luminance calculation coefficient group with the different ID.

On the other hand, when the maximum luminance value difference is equal to or greater than the predetermined lower limit of the luminance difference, the luminance calculating unit 202 determines the luminance, which has been calculated before the luminance-difference calculating unit 203 calculates the maximum luminance value difference, as luminance to be applied to each pixel of the image data that has been converted to the output color.

Referring back to FIG. 2, the image-data generating unit 204 applies the luminance (with which the maximum luminance value difference becomes equal to or greater than the lower limit of the luminance difference), which is calculated or determined by the luminance calculating unit 202, to each pixel of the image data that has been converted to the predetermined output color by the output-color converting unit 201, thereby generating the color-reduced image data that contains the reduced number of colors than the input image data.

The above-mentioned conventional method, in which "a monochrome image is formed by adjusting the luminance of only one hue without adjusting the luminance of other hues", is equivalent to a method, in which two hue regions, one of which is a hue region that is used for adjusting the luminance and the other of which is a hue region that is not used for adjusting the luminance, are provided in a color space. Therefore, in the configuration of the embodiment, to achieve advantages in that a color-reduced image can clearly represent differences between colors contained in an input image, it is necessary to provide three or more hue regions in a color space.

Figure 5:
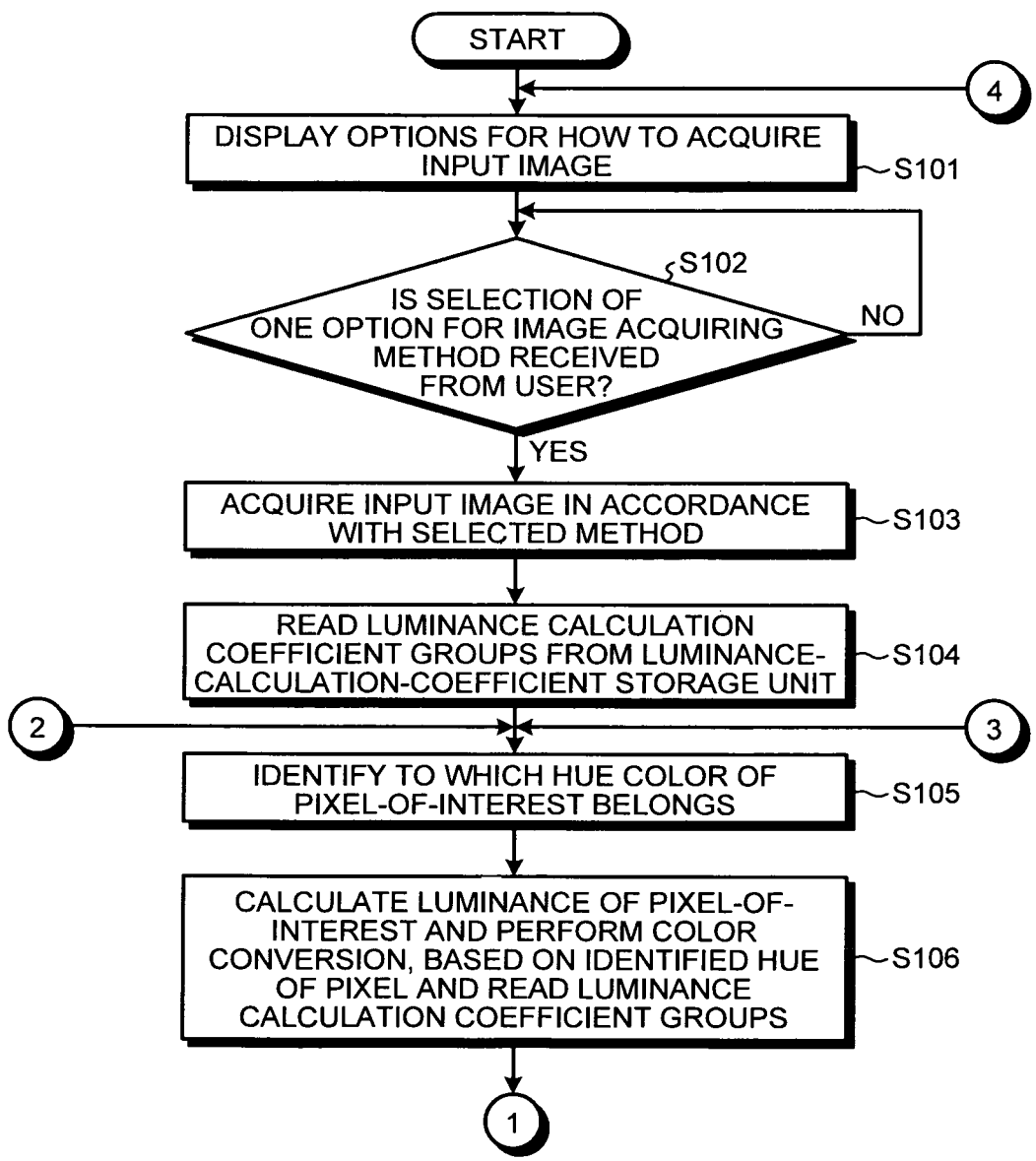
FIG. 5 is a flowchart of a procedure of image processing according to the embodiment.
Figure 6:
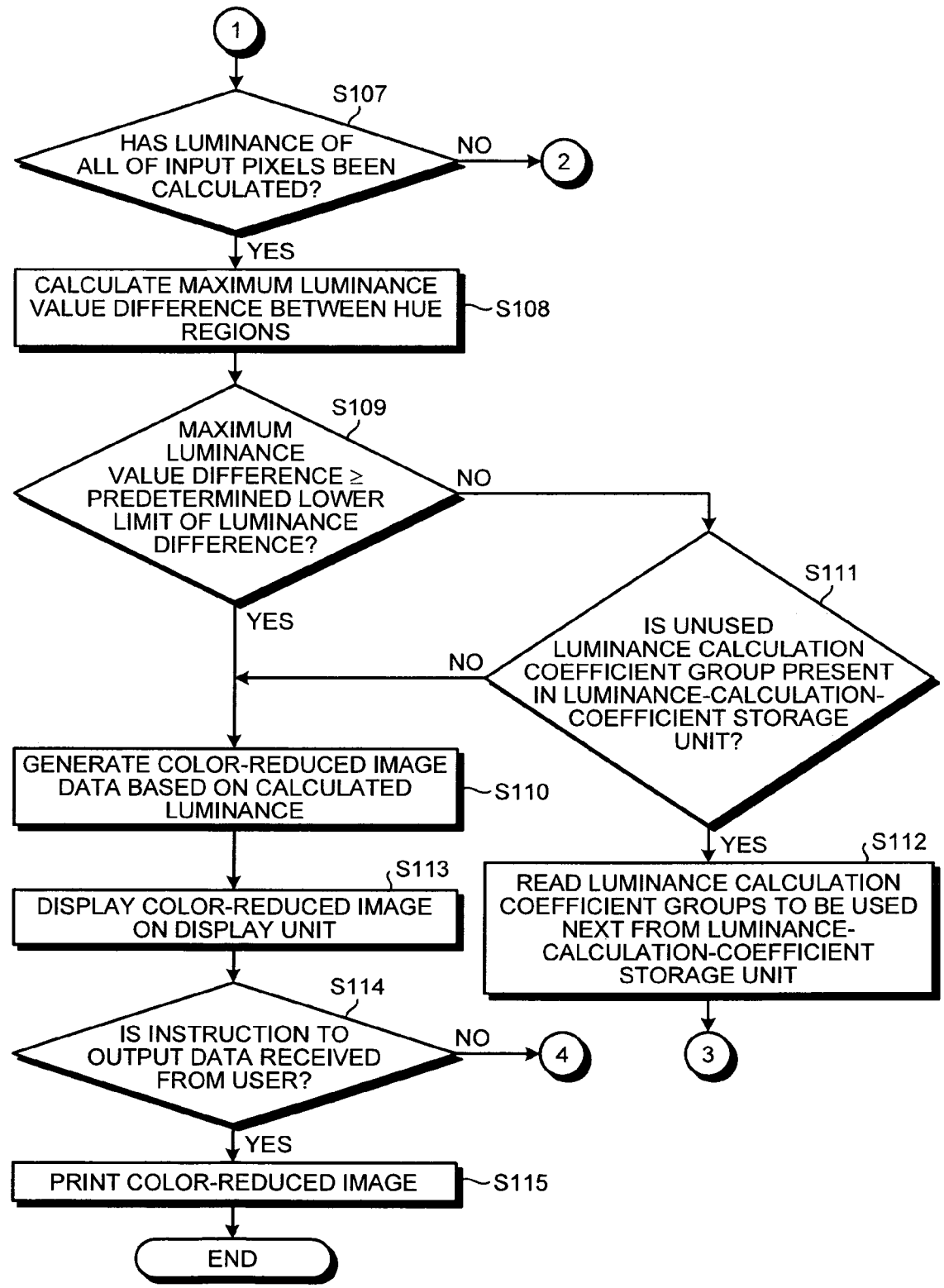
FIG. 6 is a continuous flowchart of the procedure of the image processing according to the embodiment.

Image processing performed by the image processing apparatus 1 of the embodiment, which is configured as above, will be explained below. FIGS. 5 and 6 are flowcharts of a procedure of the image processing according to the embodiment.

When a user turns on the image processing apparatus 1, the input-output control unit 41 displays options for acquiring input image data, such as to input an image by the scanner 2 or to receive an image from a PC via the communication interface 3, on the display unit 5 (Step S101). The input-output control unit 41 waits for the user to input selection of one of the options for the image acquiring method from the screen displaying the options (Step S102, NO at Step S102).

At Step S102, when receiving the selection of one of the options from the user (YES at Step S102), the input-output control unit 41 acquires input image data via the input/output interface 7 or the communication interface 3 in accordance with the selected option (Step S103).

The luminance calculating unit 202 reads a set of luminance calculation coefficient groups from the luminance calculation coefficient table in the luminance-calculation-coefficient storage unit 10 (Step S104). The hue identifying unit 42 focuses on the initial pixel contained in the input image data, for example, the pixel on the uppermost left corner of the input image (hereinafter, a pixel being focused on is described as a "pixel-of-interest"), and identifies to which hue region among the hue regions A to F illustrated in FIG. 3 the color of the pixel-of-interest belongs (Step S105).

The luminance calculating unit 202 calculates the luminance of the input pixel, and the output-color converting unit 201 converts the color of the input pixel to a predetermined output color (Step S106). More specifically, the luminance calculating unit 202 identifies a luminance calculation coefficient group to be applied to the input pixel on the basis of the luminance calculation coefficient groups that have been read at Step S104 and the hue region that has been identified by the hue identifying unit 42, and calculates the luminance to be applied to the pixel-of-interest by using Equation (1). The output-color converting unit 201 converts the color of the pixel-of-interest to an output color that has been determined in advance in accordance with the hue region (Step S106). The relationship between the output color and the hue region may be set in advance in the luminance-calculation-coefficient storage unit 10, the ROM 8, or the like, or may be set by the user through the display unit 5.

The luminance calculating unit 202 determines whether the luminance of all of the input pixels has been calculated (Step S107). When the luminance of all of the input pixel has been calculated (YES at Step S107), the processing proceeds to Step S108. On the other hand, when there is an input pixel of which luminance has not been calculated (NO at Step S107), the processing returns to Step S105, where the luminance calculating unit 202 calculates the luminance of a next input pixel as the pixel of interest.

When the luminance of all of the input pixel has been calculated, the luminance-difference calculating unit 203 identifies the maximum luminance value of the all pixels belonging to each of the hue regions for each of the hue regions A to F, and calculates a difference in the maximum luminance value (the maximum luminance value difference) between the hue regions A to F (Step S108). The luminance calculating unit 202 determines whether the maximum luminance value difference calculated by the luminance-difference calculating unit 203 is equal to or greater than the lower limit of the luminance difference that is determined in advance (Step S109).

When the maximum luminance value difference is equal to or greater than the lower limit of the luminance difference (YES at Step S109), the luminance calculating unit 202 determines the luminance value, which has been calculated for each pixel at Step S106, as the luminance to be applied to the image data that has been converted to a specific output color at Step S106, and the image-data generating unit 204 applies the luminance value to the image data that has been converted to the output color, so that color-reduced image data is generated (Step S110).

On the other hand, when the maximum luminance value difference is smaller than the predetermined lower limit of the luminance value (NO at Step S109), the luminance calculating unit 202 determines whether an unused set of luminance calculation coefficient groups is present among the luminance calculation coefficient groups registered in the luminance calculation coefficient table in the luminance-calculation-coefficient storage unit 10 (Step S111). When any unused set of luminance calculation coefficient groups is present (YES at Step S111), the luminance calculating unit 202 reads a set of luminance calculation coefficient groups to be used next, that is, a set of luminance calculation coefficient groups with a different ID (Step S112). Thereafter, the processing returns to Step S105, where the luminance is repeatedly calculated by using the luminance calculation coefficients contained in the luminance calculation coefficient group with this ID, in accordance with Equation (1).

On the other hand, at Step S111, when an unused set of luminance calculation coefficient groups is not present in the luminance calculation coefficient table (NO at Step S111), the luminance calculating unit 202 determines the luminance value, which has been calculated for each pixel at Step S106, as the luminance to be applied to the image data that has been converted to the specific output color at Step S106, and the image-data generating unit 204 applies the luminance value to the image data that has been converted to the output color, so that color-reduced image data is generated (Step S110).

The input-output control unit 41 displays the color-reduced image data generated at Step S110 on the display unit 5 via the input/output interface 7 (Step S113), and asks the user whether to output the color-reduced image data to the printer 6 (Step S114). When receiving an instruction to output the color-reduced image data displayed on the display unit 5 to the printer 6 from the user (YES at Step S114), the print processing unit 210 outputs the color-reduced image data to the printer 6 via the input/output interface 7 to print the color-reduced image data (Step S115).

On the other hand, when receiving an instruction to not to output the color-reduced image data displayed on the display unit 5 to the printer 6 from the user (NO at Step S114), the input-output control unit 41 discards the color-reduced image data displayed on the display unit 5. Thereafter, the processing returns to Step S101, where the processing starts again from Step S101.

As described above, according to the embodiment, the image processing apparatus 1 classifies the colors of input pixels into the six hue regions A to F, and calculates the luminance of the pixels belonging to each of the hue regions by using different luminance calculation coefficients in order to generate color-reduced image data. Therefore, it is possible to generate a color-reduced image that can more clearly represent a difference between colors contained in the input image, compared to the conventional method in which a monochrome image is generated by adjusting the luminance of only one hue contained in an input image without adjusting the luminance of other hues.

According to the embodiment, the luminance calculating unit 202 calculates the luminance of each pixel by using a luminance calculation coefficient group that is selected first from among the luminance calculation coefficient groups, with which the maximum luminance value difference becomes equal to or greater than the predetermined lower limit of the luminance difference. However, the luminance calculating unit 202 and the image-data generating unit 204 may be configured to calculate the maximum luminance value differences by using all of the luminance calculation coefficient groups that are registered in the luminance calculation coefficient table in the luminance-calculation-coefficient storage unit 10, and generate color-reduced image data by using a luminance calculation coefficient group, with which the maximum luminance value difference becomes equal to or greater than the predetermined lower limit of the luminance difference.

Furthermore, the luminance calculating unit 202 and the image-data generating unit 204 may be configured to calculate the maximum luminance value differences by using all of the luminance calculation coefficient groups that are registered in the luminance calculation coefficient table in the luminance-calculation-coefficient storage unit 10, and generate color-reduced image data by using a luminance calculation coefficient group, with which the maximum luminance value difference becomes the largest among the calculated maximum luminance value differences.

While the six hue regions are provided in the embodiment, it is possible to provide more than six hue regions. As the number of the hue regions increases, it is possible to more precisely represent a difference between colors contained in the input image. Meanwhile, if the luminance calculation coefficients to be applied to adjacent hue regions are set to the same value, it is possible to achieve the same advantages as with the smaller number of hue regions. For example, assuming that 24 hue regions are provided and two adjacent hue regions (hereinafter, described as a "hue region pair") are bundled, and if the luminance calculation coefficients of respective hue regions of each hue region pair have the same value while the luminance calculation coefficients of different hue region pairs have different values, the same advantages as with 12 hue regions can be achieved.

First Modification

A first modification of the image processing apparatus 1 according to the embodiment will be described below. In the first modification, when receiving, at Step S114, an instruction to not to output the color-reduced image data displayed on the display unit 5, the input-output control unit 41 receives input of a luminance calculation coefficient group from a user. The luminance calculating unit 202 calculates the luminance to be applied to each pixel of the image data that has been converted to a specific output color, by using the luminance calculation coefficient group input by the user. The image-data generating unit 204 generates the color-reduced image data by using the luminance thus calculated.

The luminance calculating unit 202 additionally registers, in the luminance calculation coefficient table, the luminance calculation coefficient group input by the user.

Figure 7:
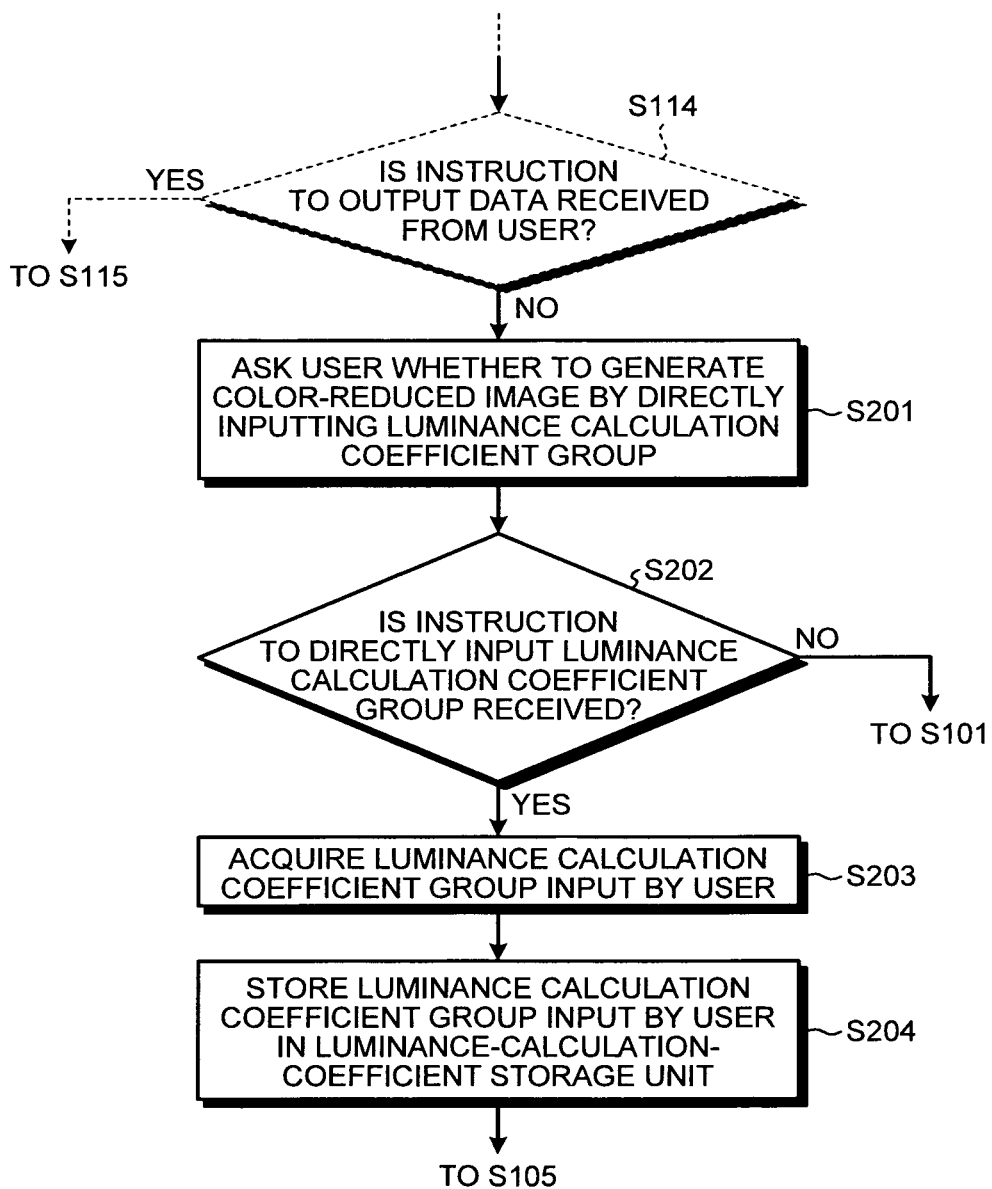
FIG. 7 is a flowchart of a procedure of image processing according to a first modification.

The operation according to the first modification can be realized by adding processing illustrated in FIG. 7 as the processing to be performed after reception of the instruction to not to output the color-reduced image data from a user at Step S114 of FIG. 6 (NO at Step S114 of FIG. 6). The operating procedure according to the first modification will be described below with reference to the flowchart of FIG. 7.

In FIG. 6, when receiving the instruction to not to output the color-reduced image data from a user (NO at Step S114 of FIG. 6), the input-output control unit 41 displays, on the display unit 5, a query about whether the user directly inputs a luminance calculation coefficient group in order to generate color-reduced image data again (Step S201). The input-output control unit 41 then determines whether an instruction to directly input a luminance calculation coefficient group is received from the user (Step S202).

When the input-output control unit 41 receives the instruction to directly input the luminance calculation coefficient group from the user (YES at Step S202), the luminance calculating unit 202 acquires the luminance calculation coefficient group input by the user through the display unit 5 (Step S203), and additionally registers the input luminance calculation coefficient group in the luminance calculation coefficient table in the luminance-calculation-coefficient storage unit 10 (Step S204). Thereafter, the processing returns to Step S105 of FIG. 5, where color-reduced image data is generated again.

On the other hand, at Step S202, when receiving an instruction to not to directly input a luminance calculation coefficient group from the user (NO at Step S202), the input-output control unit 41 discards the color-reduced image data. Then, the processing returns to Step S101 of FIG. 5, where the processing starts again from Step S101.

As described above, according to the first modification, the color-reduced image data is generated by using the luminance calculation coefficient group input by the user, and the input luminance calculation coefficient group is registered in the luminance calculation coefficient table. Therefore, it is possible to allow the user to generate color-reduced image data by using an appropriate luminance calculation coefficient group at user's option. Furthermore, it is possible to use the luminance calculation coefficient group, which has been input by the user, again in subsequent operation, enabling to set a more precise shade difference.

Second Modification

A second modification is different from the above embodiment in that different processing is performed when no luminance calculation coefficient group is present, with which the maximum luminance value difference becomes equal to or greater than the lower limit of the luminance difference for all of the hue regions, among the luminance calculation coefficient groups registered in the luminance calculation coefficient table in the luminance-calculation-coefficient storage unit 10 (NO at Step S111 of FIG. 6). According to the second modification, in the above situation, when different colors of two adjacent hue regions in the hue space are to be clearly distinguished in color-reduced image data, the luminance calculating unit 202 multiplies the luminance of each pixel belonging to each of two hue regions by a predetermined coefficient, so that the maximum luminance value difference can be equal to or greater than the lower limit of the luminance difference.

Figure 8:
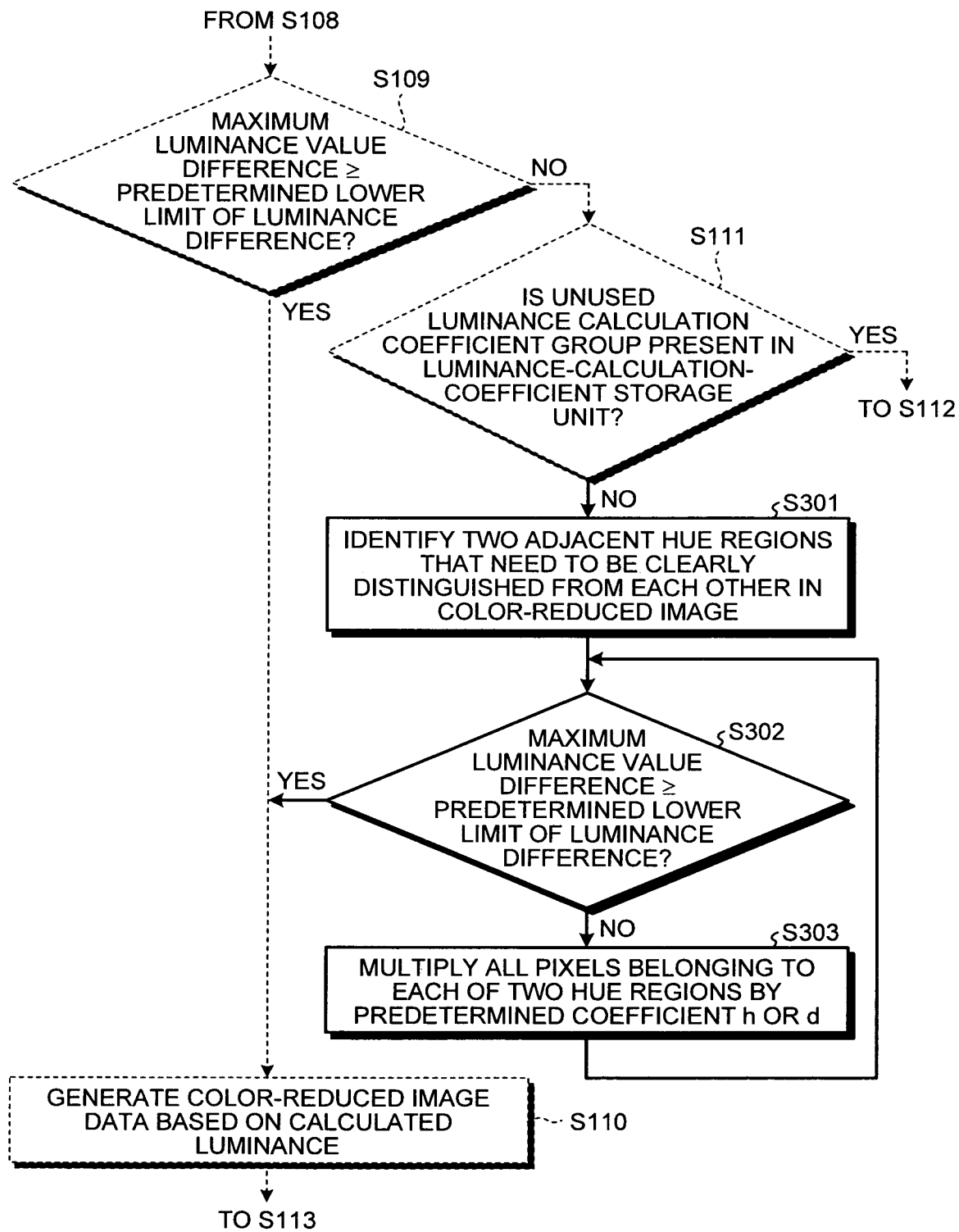
FIG. 8 is a flowchart of a procedure of image processing according to a second modification.

More specifically, the above processing can be realized by changing the processing performed after NO at Step S111 of FIG. 6 to processing illustrated in FIG. 8. The operating procedure of the second modification will be described below with reference to the flowchart of FIG. 8.

In FIG. 8, when a luminance calculation coefficient group that gives the maximum luminance value difference that is equal to or greater than the lower limit of the luminance difference is not present even after the luminance has been calculated by using all of the luminance calculation coefficient groups registered in the luminance calculation coefficient table in the luminance-calculation-coefficient storage unit 10 (NO at Step S111), the luminance calculating unit 202 identifies two adjacent hue regions that need to be clearly distinguished from each other in color-reduced image data (Step S301). The ways how to identify the hue regions may be stored in a storage medium, such as the luminance-calculation-coefficient storage unit 10, in advance, or may be input by a user through the display unit 5 each time the processing at Step S301 is performed.

The luminance calculating unit 202 determines whether the maximum luminance value difference between the two adjacent hue regions is equal to or greater than the lower limit of the luminance difference (Step S302). When the maximum luminance value difference is equal to or greater than the lower limit of the luminance difference (YES at Step S302), because it is considered that at least the two hue regions are clearly distinguished from each other in the color-reduced image data, the processing proceeds to Step S110 of FIG. 6.

On the other hand, when the maximum luminance value difference between the two adjacent hue regions is smaller than the lower limit of the luminance difference (NO at Step S302), the luminance calculating unit 202 multiplies all of the pixels belonging to each of the two hue regions by a predetermined coefficient h or a predetermined coefficient d (Step S303). Here, it is assumed that h>1 and d<1, where all of the pixels in the hue region for which the luminance needs to be increased are multiplied by the coefficient h and all of the pixels in the hue region for which the luminance needs to be decreased are multiplied by the coefficient d. That is, the luminance calculating unit 202 executes the following Expression (2) and (3).

$$(\text{Luminance of pixels in the hue region for which the luminance is increased}) \times h \quad (2)$$

$$(\text{Luminance of pixels in the hue region for which the luminance is decreased}) \times d \quad (3)$$

The luminance-difference calculating unit 203 calculates the maximum luminance value difference for the pixels obtained by the multiplication. Thereafter, the processing returns to Step S302.

At Step S302, when the maximum luminance value difference is again smaller than the lower limit of the luminance difference (NO at Step S302), the luminance calculating unit 202 multiplies the pixels, which have been obtained by the multiplication, by the coefficient h or the coefficient d in accordance with Expression (2) and (3) (Step S303), and repeats the above operation until the maximum luminance value difference for the pixels, which have been obtained by the multiplication, becomes equal to or greater than the lower limit of the luminance difference.

As described above, according to the second modification, when no luminance calculation coefficient group is present, with which the maximum luminance value difference becomes equal to or greater than the lower limit of the luminance difference for all of the hue regions, among the luminance calculation coefficient groups registered in the luminance calculation coefficient table, the luminance value of the pixels belonging to each of the two hue regions is multiplied by a predetermined coefficient so that the maximum luminance value difference becomes equal to or greater than the lower limit of the luminance difference. Therefore, when different colors contained in input image data cannot be clearly distinguished by a luminance difference between output colors in color-reduced image data, it is possible to generate color-reduced image data in which the luminance of at least specific two adjacent hue regions in the hue space is adjusted and clearly distinguished.

Third Modification

In a third modification of the embodiment, the luminance-difference calculating unit 203 calculates the maximum luminance value difference for each set of hue regions that are to be converted to the same output color contained in color-reduced image data (hereinafter, the set is described as the "hue region set"). The luminance calculating unit 202 identifies a luminance calculation coefficient group, with which the maximum luminance value difference becomes equal to or greater than the lower limit of the luminance difference for all of the hue region sets, from among the luminance calculation coefficient groups registered in the luminance calculation coefficient table in the luminance-calculation-coefficient storage unit 10. The luminance calculating unit 202 then calculates the luminance to be applied to each pixel of the image data that has been converted to the output color by the output-color converting unit 201. The image-data generating unit 204 then generates color-reduced image data by using the luminance calculation coefficients contained in the identified luminance calculation coefficient group.

For example, when the output-color converting unit 201 converts the pixels belonging to a hue region set formed of the hue regions A to C illustrated in FIG. 3 to red as an output color and converts pixels belonging to a hue region set formed of the hue regions D and F to black as an output color, the luminance calculating unit 202 calculates the maximum luminance value difference for each of the hue region set formed of the hue regions A to C and the hue region set formed of the hue regions D and F. Then, the image-data generating unit 204 generates color-reduced image data by using a luminance calculation coefficient group with which each of the calculated maximum luminance value differences becomes equal to or greater than the predetermined lower limit of the luminance difference.

Figure 9:
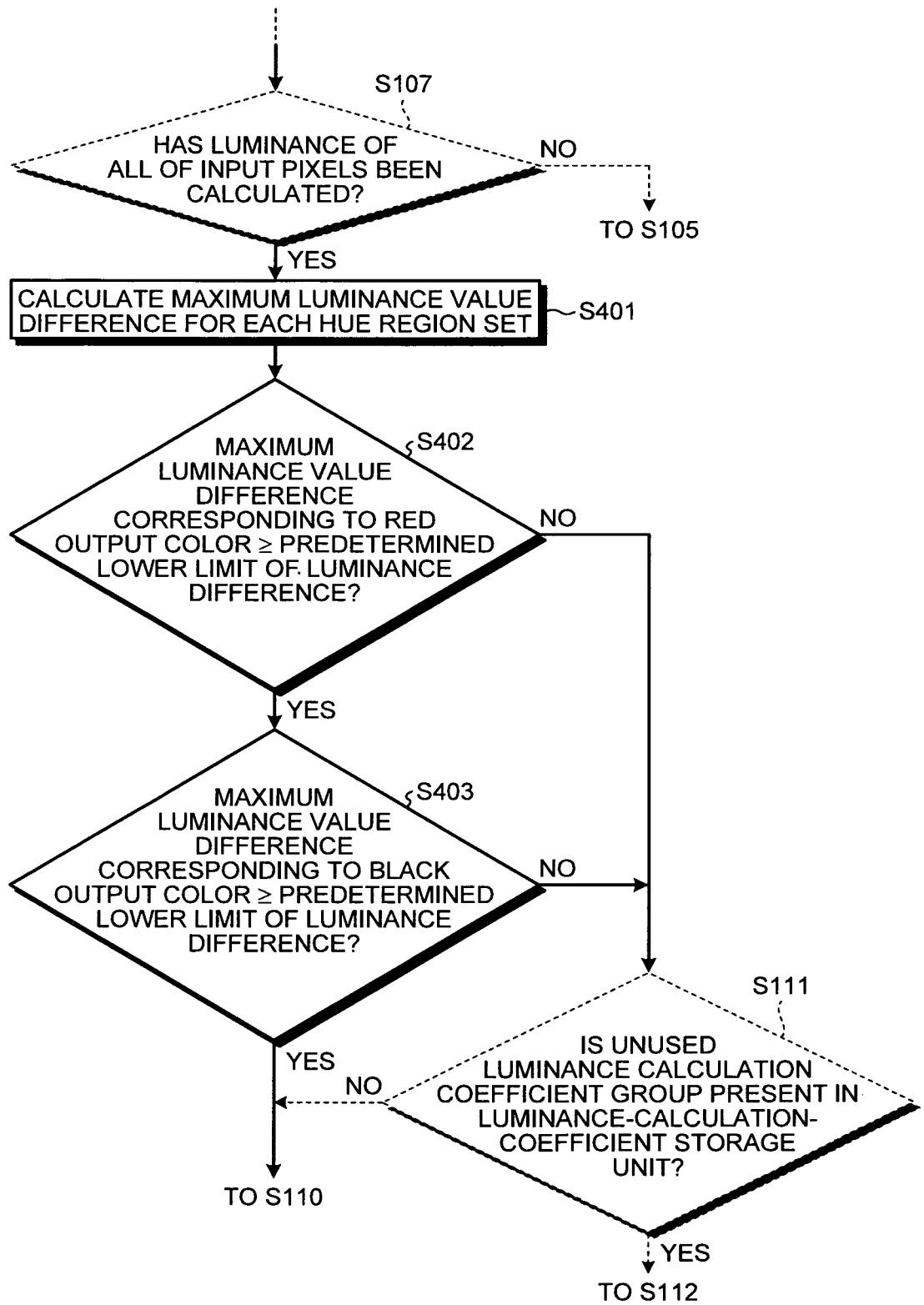
FIG. 9 is a flowchart of a procedure of image processing according to a third modification.

The operation according to the third modification can be realized by replacing the processing at Step S108 and Step S109 of FIG. 6 with processing from Step S401 to Step S403 illustrated in FIG. 9 when, for example, the two output colors, i.e., red and black, are used. The operating procedure according to the third modification will be described below with reference to the flowchart of FIG. 9.

In FIG. 9, when the luminance of all of the input pixels has been calculated (YES at Step S107), the luminance-difference calculating unit 203 calculates the maximum luminance value difference for each hue region set (Step S401). The luminance calculating unit 202 determines whether the maximum luminance value difference of the hue region set corresponding to the red output color is equal to or greater than a predetermined lower limit of the luminance difference (Step S402). When the maximum luminance value difference of the hue region set corresponding to the red output color is equal to or greater than the lower limit of the luminance difference (YES at Step S402), the luminance calculating unit 202 determines whether the maximum luminance value difference of the hue region set corresponding to the black output color is equal to or greater than a predetermined lower limit of the luminance difference (Step S403).

When the maximum luminance value difference of the hue region set corresponding to the black output color is equal to or greater than the predetermined lower limit of the luminance difference (YES at Step S403), the processing proceeds to Step S110 of FIG. 6, where color-reduced image data is generated. On the other hand, when the maximum luminance value difference of the hue region set corresponding to the red output color is smaller than the predetermined lower limit of the luminance difference (NO at Step S402), or when the maximum luminance value difference of the hue region set corresponding to the black output color is smaller than the predetermined lower limit of the luminance difference (NO at Step S403), the processing proceeds to Step S111 of FIG. 6, where whether an unused set of luminance calculation coefficient groups is present is determined.

As described above, according to the third modification, the maximum luminance value difference is calculated for each hue region set, and color-reduced image data is generated by using the luminance calculation coefficient group with which the maximum luminance value difference becomes equal to or greater than the predetermined lower limit of the luminance difference for all of the hue region sets. Therefore, it is possible to more clearly distinguish different colors of the hue regions between hue region sets by a shade difference between the output colors.

Fourth Modification

In a fourth modification of the embodiment, a set of luminance calculation coefficient groups corresponding to each type of an original is classified and registered according to each type of an original that is a basis of input image data, in the luminance calculation coefficient table in the luminance-calculation-coefficient storage unit 10. The luminance calculating unit 202 selects a luminance calculation coefficient group in accordance with the type of an original of input image data from the luminance calculation coefficient table, and calculates luminance to be applied to each pixel of the image data after conversion to an output color, on the basis of the luminance calculation coefficients contained in the selected luminance calculation coefficient group. The image-data generating unit 204 then generates color-reduced image data by using the luminance.

The types of an original are types, for which the ways to use colors are similar to each other. Examples of the types of an original include an original with a stamp in red ink, an original containing a portion written with a fluorescent pen, and an original of a map.

FIG. 10 is an explanatory diagram illustrating an example of a luminance calculation coefficient table according to the fourth modification. As illustrated in FIG. 10, an item indicating an original code is added to each luminance calculation coefficient groups in the luminance calculation coefficient table, and a value for identifying the type of an original is stored in each original code. For example, the original code "1" indicates a luminance calculation coefficient group used for an original with a stamp in red ink, the original code "2" indicates a luminance calculation coefficient group used for an original containing a portion written with a fluorescent pen, and the original code "99" indicates a luminance calculation coefficient group that can be used for any types of originals.

Figure 11:
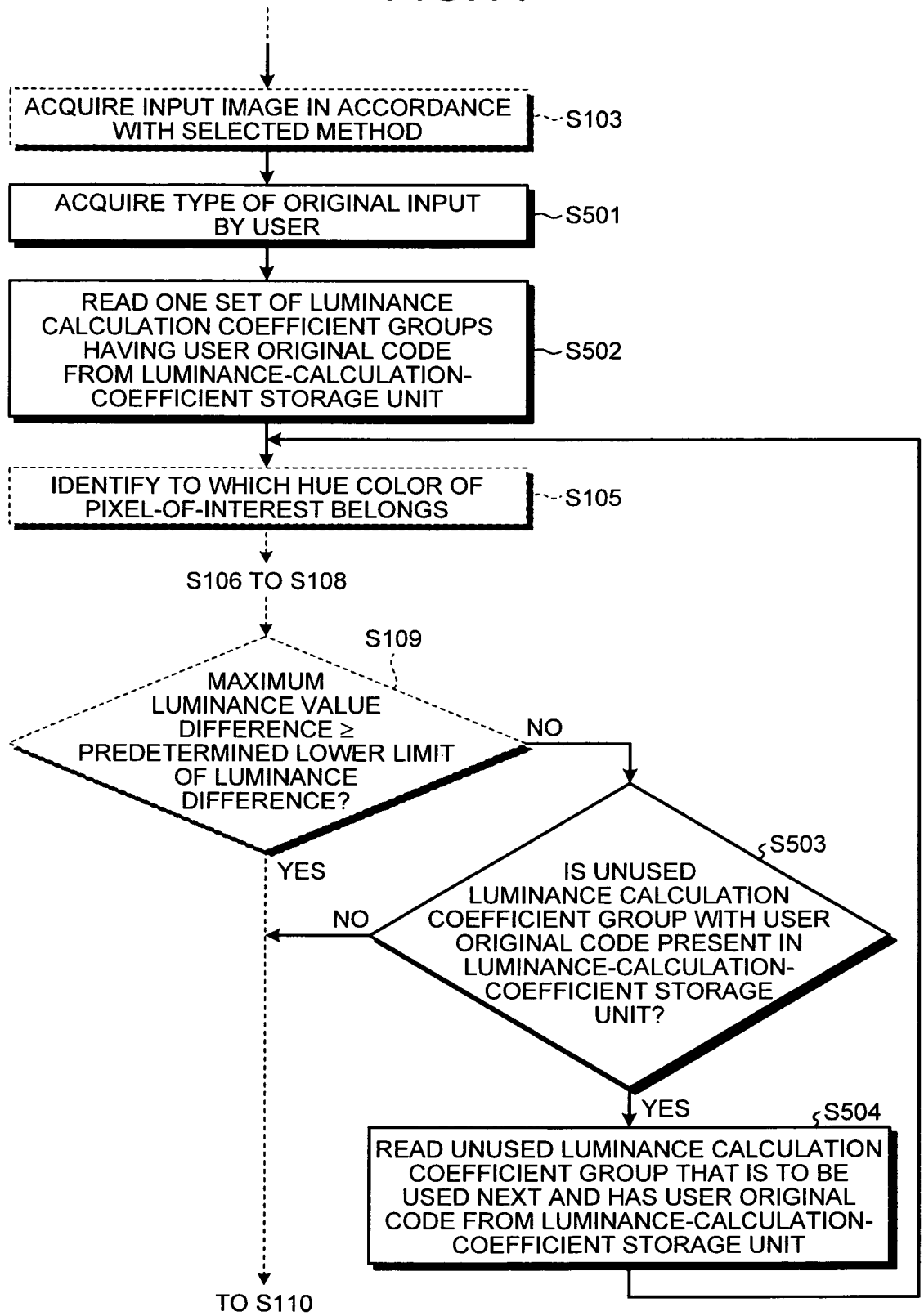
FIG. 11 is a flowchart of a procedure of image processing according to the fourth modification.

The operation according to the fourth embodiment is realized by replacing the processing at Step S104 of FIG. 5 and Steps S111 and S112 of FIG. 6 with processing illustrated in FIG. 11. The operating procedure according to the fourth modification will be described below with reference to the flowchart of FIG. 11.

In FIG. 11, after acquiring the input image data (Step S103), the input-output control unit 41 acquires the type of the original, which is input by the user through the display unit 5 (Step S501). The luminance calculating unit 202 reads luminance calculation coefficient groups having the original code corresponding to the type of the original specified by the user (hereinafter, this original code is described as the "user original code") from the luminance calculation coefficient table in the luminance-calculation-coefficient storage unit 10 (Step S502). Then, the processing proceeds to Step S105 of FIG. 5, and the processing from Step S106 to Step S109 of FIGS. 5 and 6 is subsequently performed.

At Step S109, when the luminance calculating unit 202 determines that the maximum luminance value difference is smaller than the predetermined lower limit of the luminance difference (NO at Step S109), the luminance calculating unit 202 determines whether an unused set of luminance calculation coefficient groups with the user original code are present among the luminance calculation coefficient groups registered in the luminance calculation coefficient table in the luminance-calculation-coefficient storage unit 10 (Step S503). When any unused set of luminance calculation coefficient groups with the user original code is present (YES at Step S503), the luminance calculating unit 202 reads an unused set of luminance calculation coefficient groups, which is to be used next and which has the user original code, from the luminance calculation coefficient table in the luminance-calculation-coefficient storage unit 10 (Step S504), and the processing proceeds to Step S105.

On the other hand, at Step S503, when an unused set of luminance calculation coefficient groups with the user original code is not present in the luminance calculation coefficient table (NO at Step S503), the processing proceeds to Step S110 of FIG. 6.

As described above, according to the fourth embodiment, a set of the luminance calculation coefficient groups corresponding to each type of an original is classified and registered according to each type of an original that is a basis of input image data, in the luminance calculation coefficient table in the luminance-calculation-coefficient storage unit 10, and color-reduced image data is generated by calculating the luminance that is to be applied to each pixel of image data after conversion to an output color, on the basis of the luminance calculation coefficient group corresponding to the type of the original of the input image data. Therefore, it is possible to appropriately select a luminance calculation coefficient group in accordance with the ways to use colors for each type of an original.

Fifth Modification

In a fifth modification of the embodiment, a set of luminance calculation coefficient groups corresponding to each output usage is classified and registered according to each output usage of color-reduced image data to be output, in the luminance calculation coefficient table in the luminance-calculation-coefficient storage unit 10. The luminance calculating unit 202 selects a luminance calculation coefficient group in accordance with the usage of color-reduced image data from the luminance calculation coefficient table, and calculates luminance to be applied to each pixel of the image data after conversion to an output color, on the basis of the luminance calculation coefficients contained in the selected luminance calculation coefficient group. The image-data generating unit 204 then generates the color-reduced image data by using the luminance.

The usage is a usage, for which a hue to be enhanced in color-reduced image data is similar to other hues. Example of the usage include use as a photograph, use as pop advertizing, use as a map of an urban area, and use as a contour identification map.

FIG. 12 is an explanatory diagram illustrating an example of a luminance calculation coefficient table according to the fifth modification. As illustrated in FIG. 12; an item indicating a usage code is added to each luminance calculation coefficient group in the luminance calculation coefficient table of the fifth modification, and a value for identifying the output usage of the color-reduced image data is stored. For example, the usage code "1" indicates a luminance calculation coefficient group for the use as pop advertizing, the usage code "2" indicates a luminance calculation coefficient group for the use as a map of an urban area, and the usage code "99" indicates luminance calculation coefficient group for any output usage.

Figure 13:
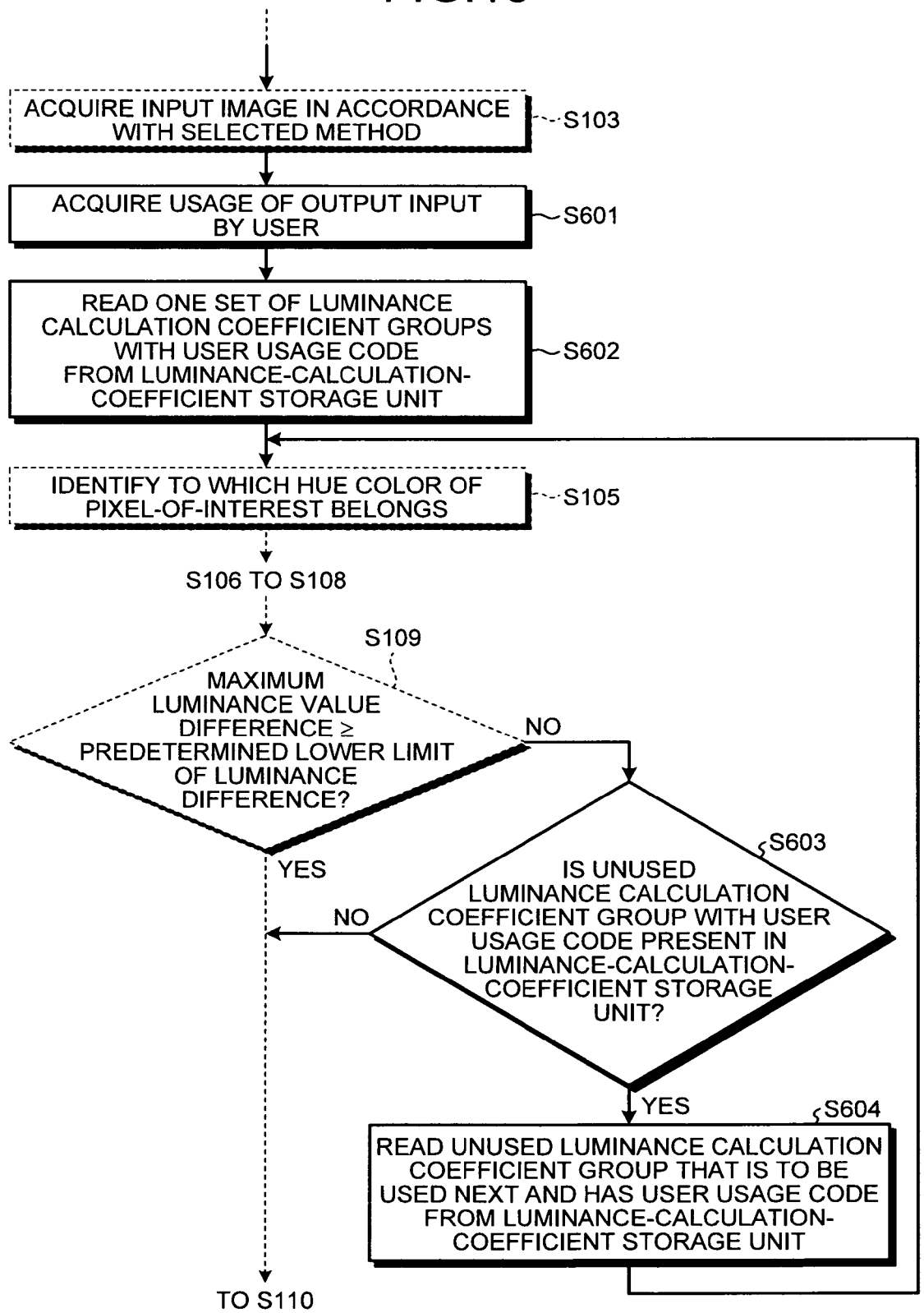
FIG. 13 is a flowchart of a procedure of image processing according to the fifth modification.

The operation according to the fifth embodiment can be realized by replacing the processing at Step S104 of FIG. 5 and Steps S111 and S112 of FIG. 6 with processing illustrated in FIG. 13. The operating procedure according to the fifth modification will be described below with reference to the flowchart of FIG. 13.

In FIG. 13, after acquiring the input image data (Step S103 of FIG. 5), the input-output control unit 41 acquires the output usage that is input by the user from the display unit 5 (Step S601). The luminance calculating unit 202 reads a set of luminance calculation coefficient groups having the usage code corresponding to the output usage specified by the user (hereinafter, this usage code is described as the "user usage code") (Step S602). Then, the processing proceeds to Step S105 of FIG. 5, and the processing from Steps S106 to S109 of FIGS. 5 and 6 is subsequently performed.

At Step S109, when the luminance calculating unit 202 determines that the maximum luminance value difference is smaller than the predetermined lower limit of the luminance difference (NO at Step S109), the luminance calculating unit 202 determines whether an unused set of luminance calculation coefficient groups with the user usage code is present among the unused luminance calculation coefficient groups registered in the luminance calculation coefficient table in the luminance-calculation-coefficient storage unit 10 (Step S603). When any unused set of luminance calculation coefficient groups with the user usage code is present (YES at Step S603), the luminance calculating unit 202 reads an unused set of luminance calculation coefficient groups, which is to be used next and which has the user usage code, from the luminance calculation coefficient table in the luminance-calculation-coefficient storage unit 10 (Step S604), and the processing proceeds to Step S105.

On the other hand, at Step S603, when an unused set of luminance calculation coefficient group with the user usage code is not present in the luminance calculation coefficient table (NO at Step S603), the processing proceeds to Step S110.

As described above, according to the fifth modification, a set of luminance calculation coefficient groups corresponding to each usage is classified and registered according to each output usage of color-reduced image data, in the luminance calculation coefficient table in the luminance-calculation-coefficient storage unit 10, and color-reduced image data is generated by calculating the luminance that is to be applied to each pixel of the image data after conversion to an output color, on the basis of the luminance calculation coefficient group that has been selected from the luminance calculation coefficient table in accordance with the output usage of the color-reduced image data. Therefore, it is possible to appropriately apply the luminance calculation coefficient group in accordance with the output usage, so that it is possible to appropriately enhance the hue that needs to be enhanced in the color-reduced image.

Sixth modification

In a sixth modification of the embodiment, the number of pixels (hue angle) contained in each of the hue regions A to F is calculated, the color of the hue region of which hue angle is the largest is determined as one of output colors, and pixels of input image data is converted into this output color.

Figure 14:
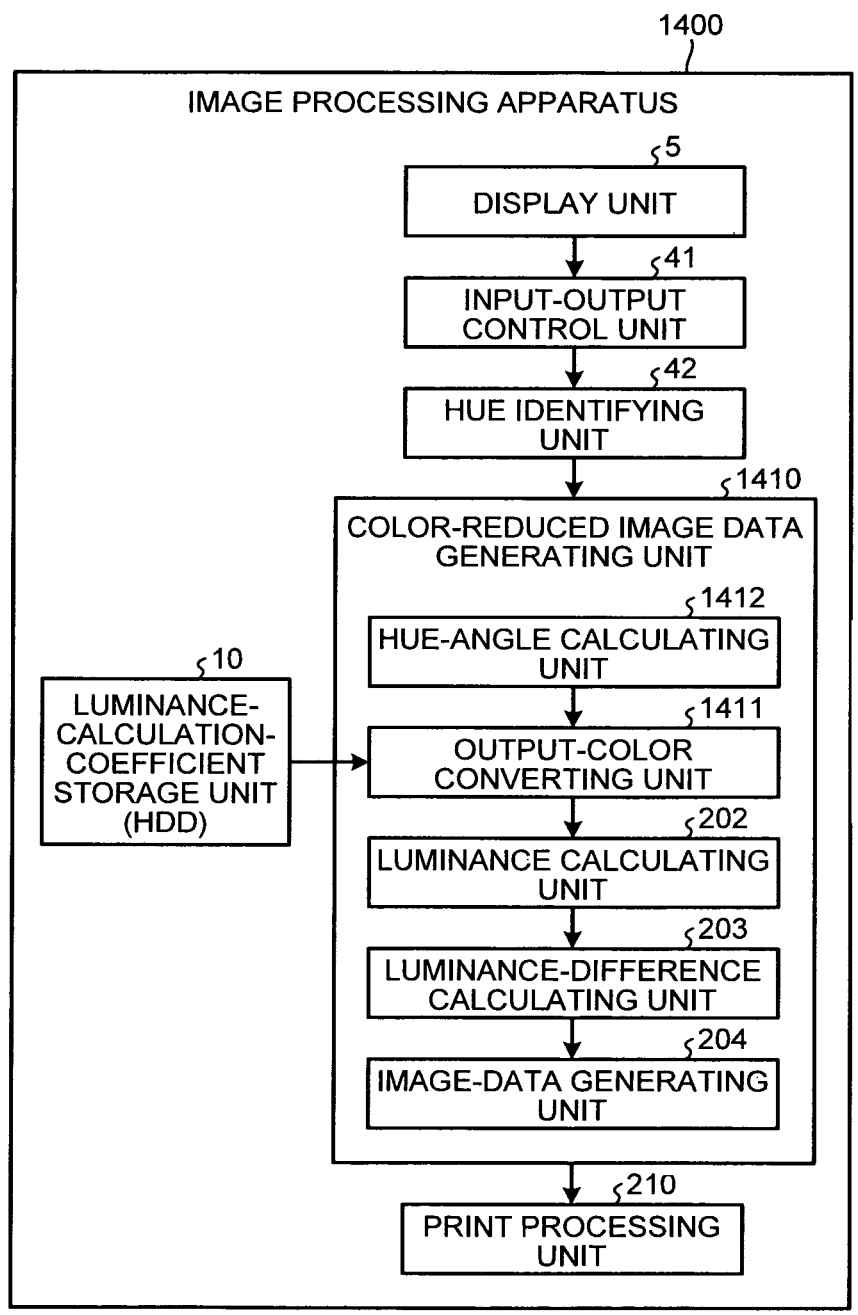
FIG. 14 is a block diagram of a functional configuration of an image processing apparatus according to a sixth modification.

FIG. 14 is a block diagram of a functional configuration of an image processing apparatus 1400 according to the sixth modification. As illustrated in FIG. 14, the image processing apparatus 1400 of the sixth modification mainly includes the display unit 5, the input-output control unit 41, the hue identifying unit 42, a color-reduced image data generating unit 1410, the print processing unit 210, and the luminance-calculation-coefficient storage unit (HDD) 10. The configurations and the functions of the display unit 5, the hue identifying unit 42, and the print processing unit 210 are the same as those of the embodiment explained with reference to FIG. 2.

As illustrated in FIG. 14, the color-reduced image data generating unit 1410 includes a hue-angle calculating unit 1412, an output-color converting unit 1411, the luminance calculating unit 202, the luminance-difference calculating unit 203, and the image-data generating unit 204. The configurations and the functions of the luminance calculating unit 202, the luminance-difference calculating unit 203, and the image-data generating unit 204 are the same as those of the embodiment explained with reference to FIG. 2.

The hue-angle calculating unit 1412 calculates the number of pixels contained in each of the hue regions. It is preferable for the hue-angle calculating unit 1412 to calculate, as pre-processing for the processing of converting the color of the input pixel (Step S106 of FIG. 5), the hue angle before the processing of determining the hue of the input pixel (Step S105 of FIG. 5).

The output-color converting unit 1411 determines that the color contained in the hue region, in which the number of pixels calculated by the hue-angle calculating unit 1412 is the largest, as a predetermined output color, and converts the colors of pixels contained in the input image data to this output color.

The color of the hue region of which hue angel is the largest is a color that represents the feature of the input image data (hereinafter, this color is described as a "feature color"), and in many cases, it is preferable to enhance the feature color in color-reduced image data. In the sixth embodiment, because the feature color is set as the output color, it is possible to generate the color-reduced image data in which the feature color, which is desired to be enhanced, is appropriately enhanced.

Seventh Modification

In a seventh modification of the embodiment, when one of the output colors contained in color-reduced image data is a secondary color that needs two color materials when being printed, the output-color converting unit 201 converts the color of each of the hue regions, which are to be converted to this output color, to this output color by changing a mixture ratio of the two color materials. Therefore, it is possible to represent different colors between the hue regions by the shade difference between the output colors.

For example, when one of the output colors is red that is generated by mixing a yellow color material with a magenta color material, and if the hue regions A to C illustrated in FIG. 3 are to be converted into the red output color, the output-color converting unit 201 converts the hue region B into red formed of the same amounts of the yellow color material and the magenta color material, converts the hue region A into yellowish red in which the yellow color material is increased, and converts the hue region C into red in which the magenta color material is increased. Therefore, it is possible to distinguish differences between colors in the input image data by the shade differences in red in the color-reduced image.

The correspondence relationship between the output color and the hue regions that form a hue region group to be converted into the output color may be set by a user through the display unit 5, or may be set in advance in a storage medium, such as the HDD 10.

More specifically, the mixture ratio of the color materials for generating a secondary color as the output color may be determined in the following manner.

For example, when the secondary color as the output color is generated by mixing color materials X and Y of different colors, and the hue region group to be converted into this output color is formed of hue regions 0 to n, the output color to be applied to an input pixel belonging to a hue region m ($0 \le m \le n$) can be determined such that the amount of the color material X (g: gram)=$k \times m/n$ and the amount of the color material Y (g)=$k \times (n-m)/n$, where k is a constant for determining the total amount of the color material after the mixture. In this case, the output color for the hue region 0 (m=0) is generated with only the color material Y, the output color for the hue region n (m=n) is generated with only the color material X, and the output colors for the hue regions 1 to (n−1) are generated as different intermediate colors by mixing the color material X and the color material Y at a different mixture ratio.

Eighth Modification

In an eighth modification of the embodiment, a luminance calculation coefficient group registered in the luminance calculation coefficient table in the luminance-calculation-coefficient storage unit 10 contains values corresponding to color vision characteristics of a user. Therefore, it is possible to prevent any settings that may cause a user who has different color vision characteristics to feel that a luminance distribution of input image data and a luminance distribution of color-reduced image data are greatly different from each other, and it is possible to generate color-reduced image data that does not cause any feeling of strangeness about a correspondence relationship between the input image data and the color-reduced image data.

As described above, according to the embodiment and the modifications, pixels contained in input image data are classified into the six hue regions, and the luminance to be applied to each pixel after the color conversion is calculated by using a different luminance calculation coefficient for each of the hue regions. Therefore, it is possible to clearly distinguish a difference between colors contained in the input image data by the shade difference between output colors.

Furthermore, according to the embodiment, a plurality of luminance calculation coefficient groups, each of which is formed of luminance calculation coefficients to be applied to any of the six hue regions, is stored, and color-reduced image data is generated by using a luminance calculation coefficient group, with which the maximum luminance value difference between the hue regions becomes equal to or greater than a predetermined value, among the parameters. Therefore, it is possible to more clearly distinguish a difference between colors contained in the input image data by the shade difference between colors in the color-reduced image data.

The image processing program executed by the image processing apparatuses 1 and 1400 of the embodiment and the modifications is provided by being installed in the ROM 8 in advance; however, the present invention is not limited to this example. The image processing program to be executed by the image processing apparatuses 1 and 1400 of the embodiment and the modifications may be provided as a computer program product by being recorded in a computer-readable recording medium, such as a CD-ROM, a flexible disk (FD), a CD-R, or a DVD (Digital Versatile Disk), in an installable or executable format.

The image processing program to be executed by the image processing apparatuses 1 and 1400 of the embodiment and the modifications may be stored in a computer connected to a network, such as the Internet, and provided by being downloaded via the network. The image processing program to be executed by the image processing apparatuses 1 and 1400 of the embodiment and the modifications may be provided or distributed via a network, such as the Internet.

The image processing program to be executed by the image processing apparatuses 1 and 1400 of the embodiment and the modifications have a module structure made of the above-mentioned units (the input-output control unit 41, the hue identifying unit 42, the output-color converting units 201 and 1411, the luminance calculating unit 202, the luminance-difference calculating unit 203, the image-data generating unit 204, the hue-angle calculating unit 1412, and the print processing unit 210). As actual hardware, the CPU reads the image processing program from the recording medium and executes it to load the units on the main memory, such as the RAM 9, thereby generating the input-output control unit 41, the hue identifying unit 42, the output-color converting units 201 and 1411, the luminance calculating unit 202, the luminance-difference calculating unit 203, the image-data generating unit 204, the hue-angle calculating unit 1412, and the print processing unit 210 on the main memory.

According to one aspect of the present invention, when color-reduced image data is generated by reducing the number of colors contained in an original image, it is possible to clearly represent differences between the colors contained in the original image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a hue identifying unit that identifies to which hue region among three or more hue regions provided in a color space a hue of each pixel contained in input image data belongs;
    an output-color converting unit that converts a color of each pixel contained in the image data to a predetermined output color in accordance with the identified hue region;
    a luminance calculating unit that selects a luminance calculation coefficient corresponding to the identified hue region of each pixel from among luminance calculation coefficients that are determined in advance for the respective hue regions, and calculates luminance to be applied to each pixel of image data that has been converted to the output color, on the basis of the selected luminance calculation coefficient; and
    an image-data generating unit that applies the calculated luminance to each pixel contained in the converted image data to thereby generate color-reduced image data that contains a reduced number of colors than the input image data.

2. The image processing apparatus according to claim 1, further comprising:
    a luminance-calculation-coefficient storage unit that stores luminance calculation coefficient groups, each of which contains a plurality of luminance calculation coefficients that are determined in advance for respective colors that form an image, for the respective hue regions, wherein
    the luminance calculating unit selects a luminance calculation coefficient group corresponding to the hue region identified for each pixel from among the luminance calculation coefficient groups, and calculates luminance to be applied to each pixel of the image data that has been converted to the output color, on the basis of a plurality of luminance calculation coefficients contained in the selected luminance calculation coefficient group.

3. The image processing apparatus according to claim 2, further comprising:
    a luminance-difference calculating unit that calculates a maximum luminance value of pixels belonging to each of the hue regions, and calculates a difference in the maximum luminance value between the hue regions, wherein
    the luminance-calculation-coefficient storage unit stores a plurality of luminance calculation coefficient groups for each hue region, and
    the luminance calculating unit calculates luminance to be applied to each pixel of the converted image data, on the basis of a plurality of luminance calculation coefficients contained in a luminance calculation coefficient group with which the difference in the maximum luminance value becomes equal to or greater than a predetermined lower limit.

4. The image processing apparatus according to claim 3, wherein
    the luminance calculating unit determines whether the difference in the maximum luminance value is equal to or greater than a predetermined lower limit, and
    the image-data generating unit applies the calculated luminance to each pixel of the converted image data when the difference in the maximum luminance value is equal to or greater than the predetermined lower limit, thereby generating the color-reduced image data.

5. The image processing apparatus according to claim 4, wherein
    the luminance-calculation-coefficient storage unit stores a plurality of luminance calculation coefficient groups for each hue region, and
    when the difference in the maximum luminance value is smaller than the predetermined lower limit, the luminance calculating unit selects a different luminance calculation coefficient group in accordance with the identified hue region, and calculates luminance to be applied to each pixel of the converted image data, on the basis of a plurality of luminance calculation coefficients contained in the different luminance calculation coefficient group.

6. The image processing apparatus according to claim 3, wherein
    the luminance-difference calculating unit calculates the maximum luminance value of pixels belonging to each of the hue regions, and calculates a difference in the maximum luminance value between the hue regions, and
    the luminance calculating unit calculates luminance to be applied to each pixel of the converted image data, on the basis of a plurality of luminance calculation coefficients contained in a luminance calculation coefficient group with which the difference in the maximum luminance value becomes the largest.

7. The image processing apparatus according to claim 2, further comprising:
    a display unit that displays the generated color-reduced image data;
    an input receiving unit that receives, from a user, input of allowance or refusal of output of the displayed color-reduced image data; and
    a printing unit that prints the color-reduced image data when the input receiving unit receives the input of allowance of output of the displayed color-reduced image data.

8. The image processing apparatus according to claim 7, wherein
    the input receiving unit receives input of a luminance calculation coefficient group from a user when receiving the input of refusal of output of the displayed color-reduced image data, and the luminance calculating unit calculates luminance to be applied to each pixel of the converted image data, on the basis of the luminance calculation coefficient group input by the user.

9. The image processing apparatus according to claim 3, wherein
when the luminance calculation coefficient group, with which the difference in the maximum luminance value becomes equal to or greater than the predetermined lower limit, is not present in the luminance-calculation-coefficient storage unit, the luminance calculating unit multiplies luminance of each pixel in each of predetermined two adjacent hue regions by a predetermined coefficient, thereby calculating luminance to be applied to each pixel of the converted image data.

10. The image processing apparatus according to claim 3, wherein
the luminance-difference calculating unit calculates a difference in the maximum luminance value for each set of the hue regions, each set being converted to a different output color, and
the luminance calculating unit calculates luminance to be applied to each pixel of the converted image data, on the basis of a luminance calculation coefficient group, with which any one or all of the differences in the maximum luminance value becomes the largest, among the luminance calculation coefficient groups stored in the luminance-calculation-coefficient storage unit.

11. The image processing apparatus according to claim 2, wherein
the luminance-calculation-coefficient storage unit stores luminance calculation coefficient groups of the hue regions with respect to each type of the original, and
the luminance calculating unit selects a luminance calculation coefficient group in accordance with the type of the original of the input image data from the luminance-calculation-coefficient storage unit, and calculates luminance to be applied to each pixel of the converted image data, on the basis of a plurality of luminance calculation coefficients contained in the selected luminance calculation coefficient group.

12. The image processing apparatus according to claim 2, wherein
the luminance-calculation-coefficient storage unit stores luminance calculation coefficient groups of the hue regions with respect to each usage of the image data, and
the luminance calculating unit selects a luminance calculation coefficient group in accordance with the usage of the color-reduced image data from the luminance-calculation-coefficient storage unit, and calculates luminance to be applied to each pixel of the converted image data, on the basis of a plurality of luminance calculation coefficients contained in the selected luminance calculation coefficient group.

13. The image processing apparatus according to claim 1, further comprising:
a hue-angle calculating unit that calculates the number of pixels contained in each of the hue regions, wherein
the output-color converting unit determines, as the predetermined output color, a color that is contained in a hue region which is determined as having the maximum number of pixels by the calculation performed by the hue-angle calculating unit, and converts the color of pixels contained in the image data to the output color.

14. The image processing apparatus according to claim wherein
one of the output colors is a secondary color that is formed by mixing two color materials at the time of printing, and
the output-color converting unit converts colors of pixels in different hue regions in the image data to different secondary colors by changing a mixture ratio of the two color materials in accordance with the identified hue region.

15. The image processing apparatus according to claim 1, wherein
the luminance-calculation-coefficient storage unit stores luminance calculation coefficients that are values corresponding to color vision characteristics of a user, for the respective hue regions.

16. An image processing method comprising:
identifying to which hue region from among three or more hue regions provided in a color space hue of each pixel contained in input image data belongs;
converting a color of each pixel contained in the image data to a predetermined output color in accordance with the identified hue region;
selecting a luminance calculation coefficient corresponding to the identified hue region of each pixel from among luminance calculation coefficients that are determined in advance for the respective hue regions;
calculating luminance to be applied to each pixel of image data that has been converted to the output color, on the basis of the selected luminance calculation coefficient; and
applying the calculated luminance to each pixel contained in the converted image data, thereby generating color-reduced image data that contains a reduced number of colors than the input image data.

17. A computer program product comprising a non-transitory computer-readable medium having computer-readable program codes recorded in the medium, the program codes when executed causing a computer to execute:
identifying to which hue region from among three or more hue regions provided in a color space hue of each pixel contained in input image data belongs;
converting a color of each pixel contained in the image data to a predetermined output color in accordance with the identified hue region;
selecting a luminance calculation coefficient corresponding to the identified hue region of each pixel from among luminance calculation coefficients that are determined in advance for the respective hue regions;
calculating luminance to be applied to each pixel of image data that has been converted to the output color, on the basis of the selected luminance calculation coefficient; and
applying the calculated luminance to each pixel contained in the converted image data, thereby generating color-reduced image data that contains a reduced number of colors than the input image data.

* * * * *